United States Patent [19]

Hickman et al.

[11] 4,253,224
[45] Mar. 3, 1981

[54] FIXTURELESS METHOD OF MAKING TUBE JOINTS

[75] Inventors: Stephen L. Hickman; Clifford E. Pifer, both of Adrian, Mich.

[73] Assignee: Brazeway, Inc., Adrian, Mich.

[21] Appl. No.: 970,283

[22] Filed: Dec. 18, 1978

Related U.S. Application Data

[63] Continuation of Ser. No. 805,591, Jun. 8, 1977, abandoned.

[51] Int. Cl.³ ............................................. B23P 15/00
[52] U.S. Cl. ................................. 29/157 T; 285/197;
403/237; 113/116 UT; 29/33 T; 83/861;
72/367
[58] Field of Search ................ 29/157 T, 157.4, 33 T;
228/173 F; 113/116 UT; 285/197, 156, 198,
199; 403/237, 234, 191, 13, 14; 409/143;
83/861, 875; 72/367

[56] References Cited

U.S. PATENT DOCUMENTS

| 414,194 | 11/1889 | Cottle | 228/173 F |
|---|---|---|---|
| 1,823,028 | 9/1931 | Caldwell | 113/116 UT |
| 1,908,821 | 5/1933 | Cornell, Jr. | 285/197 |
| 2,297,013 | 9/1942 | Nichols et al. | 29/157 T |
| 2,387,154 | 10/1945 | Kalwitz | 403/237 |
| 3,680,349 | 8/1972 | Horton | 29/157 T |
| 3,812,698 | 5/1974 | Stock | 29/157 T |
| 3,849,851 | 11/1974 | Kaltz | 29/157.4 |

FOREIGN PATENT DOCUMENTS

| 50191 | 4/1935 | Denmark | 29/157.4 |
|---|---|---|---|
| 2329997 | 1/1975 | Fed. Rep. of Germany | 29/157 T |

Primary Examiner—Daniel C. Crane
Attorney, Agent, or Firm—Krass & Young

[57] ABSTRACT

A method of joining tubular elements to provide fluid tight connections is disclosed in which the mating portions of the joined tubes are preformed so as to be able to be located with respect to each other prior to soldering, brazing, or other joining process. The preforming operations involve the punching or shearing of an opening in the sidewall of a body tube to which a branching tube is to be joined, in which shearing operation a pair of cusps or tabs are formed at opposite locations on either side of the sheared hole. The punching or shearing is carried out by a punch tool moved to intercept a segment of the body tube sidewall to form an opening, with portions of the tubing wall on either side of the opening formed remaining, these portions being displaced upwardly by the tool to provide the locating cusps or tabs at the periphery of the opening so-formed. The end of the branch tube is initially slotted prior to being formed by means of a swaging tool into a saddle shape suitably formed to snap over the body tube section with the tabs cooperating with the interior of the branch tube to provide a locating function such as to enable correct positioning of the tube over the opening punched in the body tube sidewall. Once in position, the tubes are then joined in position by conventional soldering, brazing, or other suitable joining process.

1 Claim, 13 Drawing Figures

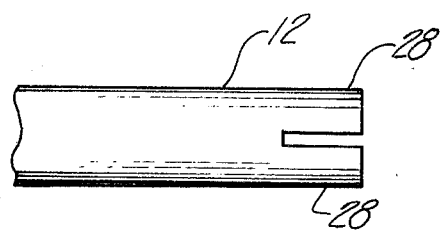
Fig-8
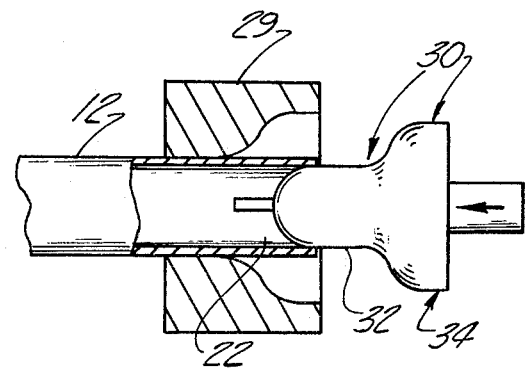
Fig-9
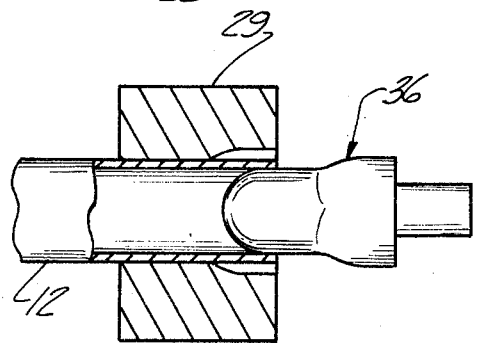
Fig-10
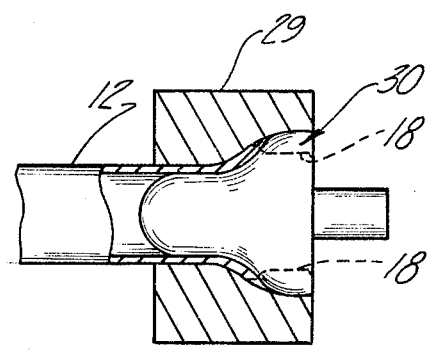
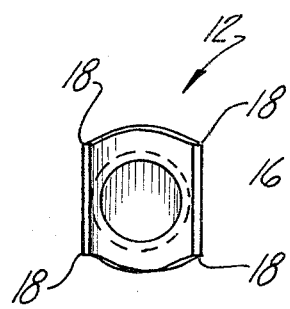
Fig-12
Fig-11
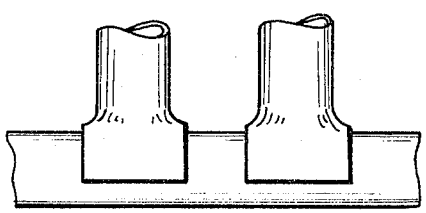
Fig-13

FIXTURELESS METHOD OF MAKING TUBE JOINTS

This is a continuation of application Ser. No. 805,591, filed June 8, 1977 now abandoned.

BACKGROUND OF THE INVENTION

1. Field of the Invention

This invention concerns methods of joining tubing sections, and more particularly, in joining the tube sections to each other in a transverse direction, as in making branching connections.

2. Description of the Prior Art

The making of tubing or piping joints of the type in which one tube is joined to a second tube extending along a transverse direction without the use of fittings, is commonly done in the manufacture of refrigerant assemblies such as headers, etc. and other similar applications. The economics of these applications are such that the added expense of tube fittings would be prohibitive, and conventional practice is to directly join the connected tube elements by welding, brazing or soldering the tube elements together. Since no fittings are used, it is necessary to provide fixturing to properly position one tube with respect to each other while the mechanical joining process is carried out as by soldering or brazing of the joint. This fixturing is particularly necessitated in those applications in which tubes of similar size are so joined since one tube may not be securely positioned within the opening formed in the other tube without causing the branch tube to protrude substantially into the main or body tube element creating a restriction within the body tube. This fixturing adds to the capital investment necessary for the manufacture of the tubing assemblage, and also adds considerably to the labor involved in the process and would be a major hindrance in any attempt to automate the manufacturing process.

Accordingly, it is an object of the present invention to provide a method of joining tubular elements to each other in transverse or intersecting directions in which the locating of the tubes during the welding or other joining process is carried out without the use of fixturing.

A further object of the present invention is to provide such a method which does not necessitate the use of fittings in making the joints.

Another object of the present invention is to provide such a method which is applicable to mating tubing elements of similar or the same size.

It is yet another object of the present invention to provide such a method which does not involve elaborate equipment or any particularly complex forming processes on the tubes themselves.

SUMMARY OF THE INVENTION

These and other objects which will become apparent upon a reading of the following Specification and Claims are accomplished by a preforming of the mating portions of the tubular elements to be joined. The configuration of the preformed portions is such that the tubes may be snapped together in proper location with respect to each other. The preforming involves the shearing or punching of an opening in the sidewall of the main or body tube by directing a punching tool transversely to the tubing and offset from its axis to form the opening. The configuration of the tool and its position with respect to the tubing results in unsheared portions remaining after the punching operation located on opposite sides of the punched opening which are deformed upwardly by the tool to provide a locating tab structure on either side of the formed opening. The branch tube to be joined to the body tube is preformed with a saddle-shaped end configuration by first slotting the tubing end and swaging the semi-cylindrical segments so-formed into opposite portions of the saddle shape adapted to mate with the exterior of the body tube. The four corners of the saddle shape are located to provide a self-locating gripping engagement with the body tube so as to maintain the branch tube in secure position with respect to the body tube. The branch tube is located over the opening in the body tube sidewall by virtue of the engagement of the inner diameter of the branch tube with the tab portions formed at opposite points on the opening. The tubes are then joined by conventional techniques such as welding or brazing. The resulting joint provides a good sealing connection since the saddle overlay on the exterior of the body tube provides a space for receiving brazing or welding material.

DESCRIPTION OF THE DRAWINGS

FIG. 8 shows an end section of a branch tube which has been slotted in an initial step in the forming operations according to the present invention.

FIG. 9 shows the slotted tube end section shown in FIG. 8 with a swaging tool to the initial position prior to forming the saddle joint.

FIG. 10 shows a side elevational view of the branch tube section and forming tool shown in position in FIG. 9.

FIG. 11 is a sectional view of a branch tube end portion shown in FIGS. 8 through 10 after forming and prior to withdrawal of the forming tool.

FIG. 12 shows an end wise view of the saddle joint configuration shown in FIG. 11.

FIG. 13 shows the joint connections according to the present invention applied to a header or distributor-type application.

DETAILED DESCRIPTION

In the following detailed description, certain specific terminology will be utilized for the sake of clarity and particular embodiments described in accordance with 35 USC 112. However, it is to be understood that the same is not intended to be limiting and indeed should not be so construed inasmuch as the invention is capable of taking many forms and variations within the scope of the appended claims.

Figure 1:
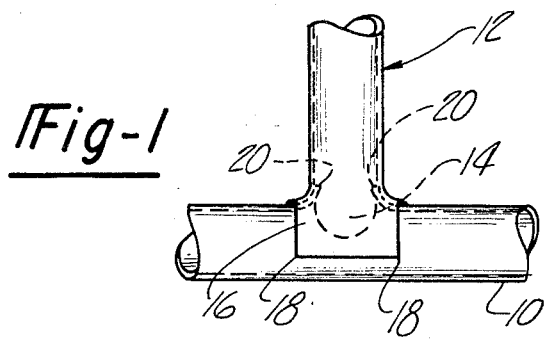
FIG. 1 is a plan view of a completed tube joint made according to the method of the present invention.
Figure 2:
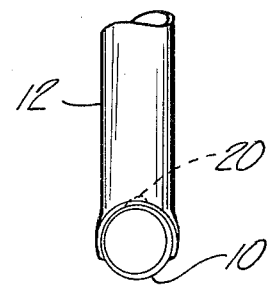
FIG. 2 is an end sectional view of the joint shown in FIG. 1.
Figure 3:
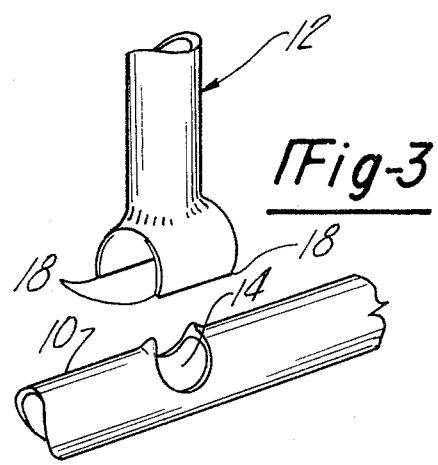
FIG. 3 is an exploded perspective view of the mating tubes prior to forming the joint shown in FIGS. 1 and 2.
Figure 4:
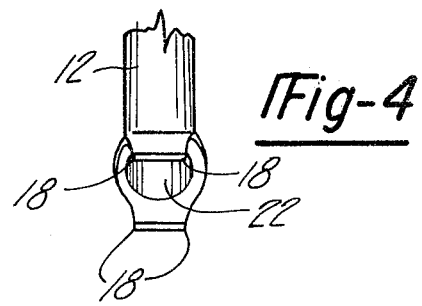
FIG. 4 is an end-wise perspective view of the branch tube showing the details of the saddle configuration formed in the end of the branch tube.
Figure 5:
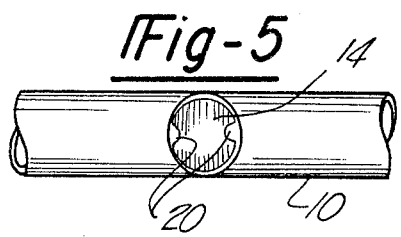
FIG. 5 is a plan view of the body tube showing the configuration of the opening formed in the body tube.

Referring to the drawings and particularly to FIGS. 1 through 3, the present invention is concerned with the joining of a body tube section 10 and a branch tube 12 which intersects the body tube 10 in the transverse direction shown in FIGS. 1 through 3 as being at right angles thereto. The fluid communication of the joint is through an opening 14 formed in the sidewall of the body tube 10 and into the aligned internal diameter of the end section 16 formed on the branch tube end 12. The end section 16 is formed to have a configuration such as to mate with the outer surface of the body tube 10 and grip the same so that during the joining process in making the connection, the branch tube 12 is positioned with respect to the body tube 10 entirely by means of this engagement to eliminate the need for fixturing for this purpose.

The configuration of the formed end section 16 for mating with tubing which is circular in cross section comprises a saddle shape with either side of the saddle formed in a partially circular configuration, greater than 180°, so as to be adapted to mate with the exterior surface of the body tube 10 in the region of the opening 14. In addition, the four corners 18 of the saddle configuration preferably are bent slightly inwardly of the circular contour so as to provide a secure gripping engagement with the outer surface of the body tube 10 in the region of the opening 14. The mating of the saddle shape for this purpose extends beyond 180° of overlap with the body tube exterior, i.e., beyond the point of tangency so that the branch tube is securely retained and located thereon.

The opening 14 formed in the sidewall of the tube 10 is provided with a pair of cusp or tab portions 20 which are oppositely disposed on either side of the opening 14 and generally aligned along the length of the body tube 10. The spacing of the tab portions enable them to act as locating tabs by engaging the interior 22 of the branch tube 12 at it transitions into the saddle end formed sections 16 as shown in FIG. 1. This provides a longitudinal locating device which serves to position properly the branch tube 12 along the length of the body tube 10. Also, it serves to locate the same in a circumferential direction so that upon positioning the branch tube 12 over the opening 14 formed in the body tube 10, the correct alignment of the inside diameter or interior bore 22 in the opening 14 is obtained.

The saddle-shaped end sections 16 are joined in the region of the overlay with the outer surface of the body tube 10 which in most typical applications, such as an aluminum tubing, would be provided by a brazing together of these elements, or in other paplications such as copper tubing, a solder connection could be made; or adhesives in appropriate applications. This provides a sound mechanical connection and more reliable sealing than that afforded by a simple intersection of a branch tube and a body tube since there is considerable interface available for accepting brazing or soldering material for creating juncture at that location. Thus, the entire space in the region of the overlay will normally be occupied with brazing material, serving to create more reliable seal connections and also a mechanically strong joint.

Referring to FIGS. 6 through 12, the specific methods of forming the end section 16 of the branch tube 12 and the opening 14 formed in the body tube 10 are disclosed.

Figure 6:
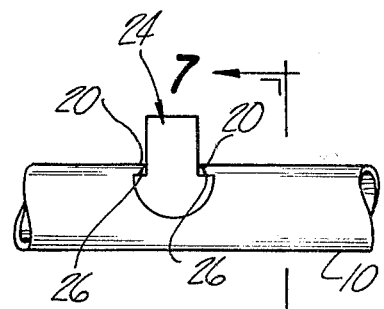
FIG. 6 is a front elevational view of a section of a body tubing element showing the positioning of a special punch or shear blade adapted to form the opening in the body tube.
Figure 7:
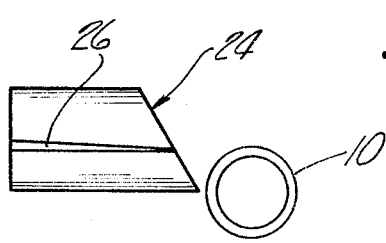
FIG. 7 is a side view of a portion of the punch tool and tube shown in FIG. 6.

In FIGS. 6 and 7, the body tube 10 is positioned with respect to a punch or shear tool 24 which acts along a line of action transverse to the axis or length of the body tube 10 but at a point offset from the centerline of the body tube 10 so that the opening 14 is formed in the sidewall of the body tube 10 by a transverse shearing or punching action. The configuration of the tool 24 is such that there is an under-cutting during this action which leaves a pair of cusp portions described above. A sloping side surface which may be provided at 26 on the tool 24 on either side acts to displace the cusp portion upwardly to form the locating tubes 20 described above.

FIGS. 8 through 11 depict the forming of the end section 16 of the branch tube 12 which includes an initial step of slitting, sawing or otherwise forming a slot 27 in the end section of the branch tube 12 so as to create two oppositely disposed semi-cylindrical segments 28 in the region of the end section 16. These segments are then reshaped by means of a die 29 and swaging tool 30 having a pilot 32 slidably disposed in the bore 22 of the branch tube 12 to reshape the end sections 28 into the saddle configuration described above in connection with the description of FIGS. 1 through 5. As shown in FIGS. 8 through 11, in this reshaping the segments are formed into a curvature extending transversely to the radius of said branch tube and along the length of the slot 27. The configuration of the swaging tool 30 includes a body portion 34 which transitions into the pilot 32 and which has an outer surface 36 which is configured like the outside diameter of the outer surface of the body tube 10. Thus, upon completion of the forming stop as shown in FIG. 11, the end sections are shaped into the saddle configuration and will mate with the outer surface of the body tube 10 in the region of its openings.

The four end corners are slightly displaced inwardly from the cylindrical shape of the remainder of the mating shapes so that in conjunction with the greater than 180° overlap creates a secure gripping of the outside surface of the body tube 10. These corners may be formed directly by the tool 30 depending upon the forming characteristics of the tubing material or by a separate forming operation. The branch tube then need only be positioned with respect to the body tube 10 located by virtue of the locating tabs 20 and the mating engagement of the saddle-formed end section 16 and the brazing, soldering or other joining process carried out.

Thus, this process has eliminated the need for any fixturing or jigging of the tubes during brazing by creating a self-locating engagement.

While this method has particular advantage when applied to tubes of a similar diameter, it is, of course, applicable to those instances where tubing of smaller diameter is joined to a relatively large diameter header tube in which instance the only requirement is that the end sections 16 of the branch tubes 12 be suitably configured to permit the gripping engagement with the header tube 10 shown in FIG. 13.

While this invention has been described in the context of aluminum or copper tubing, such as is used in refrigeration and air conditioning applications, it is, of course, applicable to other situations with similar requirements. Furthermore, while the sections of tubing joined have been referred to as tubing, it should be understood that this term includes such elements as piping, conduit, etc. and is intended to be a generic term for such hollow elements.

The embodiments of the invention in which an exclusive property or privilege is claimed are defined as follows:

1. A method of forming a tube joint between a circular-in-section body tube and a transversely intersecting branch tube, comprising the steps of:
   (A) forming an opening in the side wall of said body tube, said forming step being performed by the substeps of—
      (1) punching said opening along a line of action transverse to the length of said body tube and offset from the centerline of said body tube, said punching step resulting in the formation of cusped portions along the edge of said opening aligned with the length of said body tube,
      (2) forcing said cusped portions outwardly from said side wall of said body tube, whereby said cusped portions are adapted to engage the inner diameter of said branch tube;
   (B) reshaping an end section of said branch tube into a saddle shape adapted to grip said body tube, said re-shaping step being performed by the substeps of—
      (1) cutting first and second slots in diametrically opposed sides of said branch tube,
      (2) forming first and second segments defined by said slots into respectively corresponding opposing arcuate shapes about an axis, said segment being adapted to partially encircle at least one half of the circumference of said body tube;
   (C) positioning said end section of said branch tube over said opening in said main tube in gripping engagement with said side wall of said body tube and with said cusped portions engaging the inner diameter of said branch tube; and
   (D) joining said end section of said branch tube and said side wall of said body tube.

* * * * *